United States Patent [19]

Wille et al.

[11] Patent Number: 5,539,742
[45] Date of Patent: Jul. 23, 1996

[54] PROCESS FOR SIGNALLING THE CALL NUMBER IN A TELECOMMUNICATION NETWORK

[75] Inventors: Klaus Wille; Karl-Heinz Martin; Christian Kofler, all of München, Germany

[73] Assignee: Siemens Aktiengesellschaft, Munich, Germany

[21] Appl. No.: 313,083

[22] PCT Filed: Mar. 25, 1993

[86] PCT No.: PCT/DE93/00281

§ 371 Date: Sep. 29, 1994

§ 102(e) Date: Sep. 29, 1994

[87] PCT Pub. No.: WO93/20663

PCT Pub. Date: Oct. 14, 1993

[30] Foreign Application Priority Data

Mar. 30, 1992 [DE] Germany .......................... 42 10 401.7

[51] Int. Cl.⁶ ...................................................... H04Q 3/72
[52] U.S. Cl. ........................ 370/68.1; 370/110.1; 379/220
[58] Field of Search .................................. 370/58.1, 58.2, 370/58.3, 60, 60.1, 68.1, 94.1, 94.3, 110.1; 379/93, 94, 96, 220, 221, 225, 229, 230

[56] References Cited

U.S. PATENT DOCUMENTS

| | | | |
|---|---|---|---|
| 4,903,258 | 2/1990 | Kuhlmann et al. | 370/58.2 |
| 5,008,884 | 4/1991 | Yazawa et al. | 370/110.1 |
| 5,018,097 | 5/1991 | Kuhlman et al. | 364/900 |
| 5,047,923 | 9/1991 | Elstner et al. | 364/200 |
| 5,287,498 | 2/1994 | Perelman et al. | 379/220 X |
| 5,351,237 | 9/1994 | Shinohara et al. | 370/110.1 X |
| 5,390,242 | 2/1995 | Bales et al. | 370/110.1 X |

FOREIGN PATENT DOCUMENTS 57-132467  11/1982  Japan .

OTHER PUBLICATIONS

Siemens "HICOM 300 System Product Data", Ordering No. A19100–K3161–430–X–7600, pp. 55/56.

Siemens "Private Kommunikationssysteme, HICOM schafft Verbindungen" [Private communications systems, HICOM makes connections], Ordering No. A19100–K3160–A302, HICOM 300 Networking.

Siemens Aktiengesellschaft Private Communication Systems and Networks Division: "CorNet Signaling for ISDN Communication in Corporate Networks", Ordering No. A19100–K3110–G284–X–7600, Berlin and Munich 1987; CorNet functional specification, pp. 1–50.

Conference Record, IEEE Global Telecommunications Conference, N. Shigematsu, et al., "The Advanced Network Service System", Dec. 1985, pp. 1429–1433.

NTZ Nachrichtentechnische Zeitschrift, R. P. Loretan, "Flexible Numbering of Telephones over whole Area with Dispersed Translators", vol. 28, No. 7, Jul. 1975, pp. 236–238.

Groupe des Ingenieurs du Secteur Commutation du CNET, vol. 2, "Electronic Switching", 1983, The Telephone Network, pp. 41 and 42.

British Telecommunications Engineering, vol. 8, Jan. 1990, N.A.C. McLeod, "Numbering In Telecommunications", pp. 225–231.

Bergmann, Lehrbuch der Fernmeldetechnik, Berlin 1986, Band 1, p. 206.

Primary Examiner—Melvin Marcelo
Attorney, Agent, or Firm—Hill, Steadman & Simpson

[57] ABSTRACT

Telecommunication connections in a telecommunication network are directed from a telecommunication instrument (A) on the transmission side via an original node (ON) and transit nodes (TN1, . . . , TN7) to a telecommunication instrument (B) on the reception side. A number denoting the original node (ON), the A call number, the identity number of the target node and the B call number are inserted in signaling information for the telecommunication connection to be made. A test is performed in the nodes concerned in the connection on whether the A call number should be supplemented by the identity number of the node concerned. Such an addition to the A call number is done only in the original node. Thus the A call number can be simply assessed in the telecommunication instrument (B) on the reception side.

3 Claims, 4 Drawing Sheets

FIG 3a

| ON (20) | DN / ON | ... 20 | ... 28 |
|---|---|---|---|
| A | 20 | | ⑨⓪ |
| B | 28 | ⊖ | |

FIG 3b

| TN2 (22) | DN / ON | ... 20 | ... 28 |
|---|---|---|---|
| A | 20 | | ⊖ |
| B | 28 | ⊖ | |

FIG 3c

| DN (28) | DN / ON | ... 20 | ... 28 |
|---|---|---|---|
| A | 20 | | ⊖ |
| B | 28 | ⑨⑧ | |

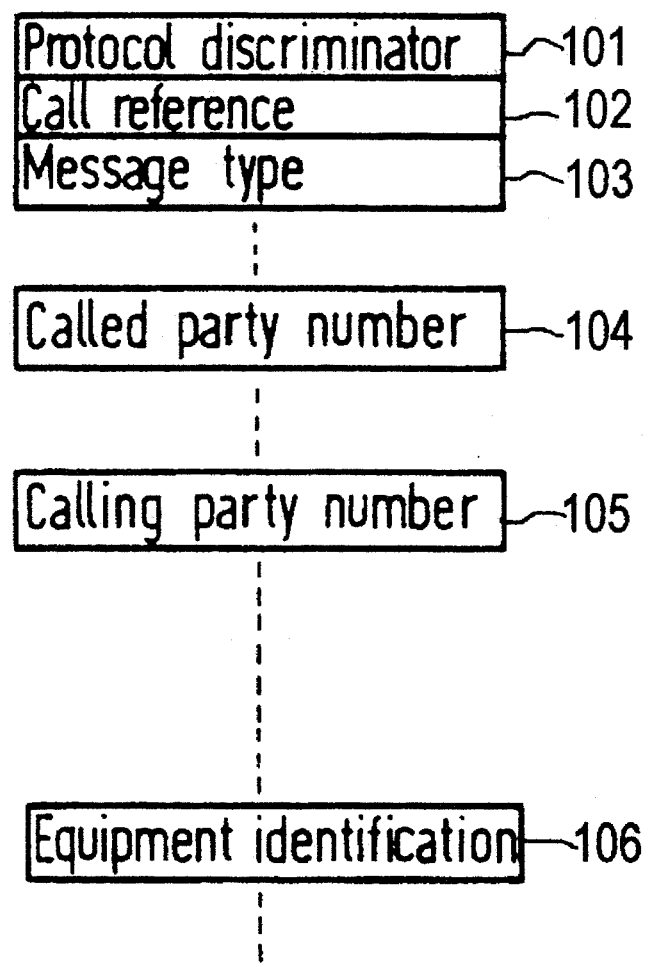

PROCESS FOR SIGNALLING THE CALL NUMBER IN A TELECOMMUNICATION NETWORK

BACKGROUND OF THE INVENTION

In telecommunication networks there are two methods of numbering, that is to say of identifying, subscriber lines, switching centers or network areas: closed numbering and open numbering. In the case of closed numbering, the identity number of the switching centers is combined with the ordinal number of the associated subscriber lines, that is to say the identity number of the switching center is a fixed component part of the subscriber call number, it is contained therein in concealed form. In the case of open numbering, the numbering areas of the network are identified by a sequence of digits which are to be dialed in addition to the subscriber call numbers when setting up a connection between the network areas (Bergmann, Lehrbuch der Fernmeldetechnik [Textbook of Telecommunication Engineering], Volume 1, 5th edition, Berlin 1986, page 206).

In private and public ISDN networks, when setting up a connection the call number of the calling (A) subscriber is signaled to the called (B) subscriber. The call number of the A subscriber is required for implementing various facilities, inter alia for call number indication on a display of the terminal equipment on the reception side (B), for call-back when free and for redialing by the B subscriber. In open-numbering networks, when setting up a telecommunication connection which is routed from an origin node, via transit nodes, to a destination node, the A call number is to be supplemented by the identity number of the origin node. This supplementing is required, for example, in order that all the dialed digits which are to be entered into the B terminal equipment in order to reach the A terminal equipment are indicated on the display of the B terminal equipment.

If the telecommunication connection is set up from the origin node via a plurality of transit nodes of the network to the telecommunication terminal equipment on the reception side, the signalling information of the connection to be set up is supplemented by a node-individual identity number in each node involved in the setup of the connection. Depending on the number of nodes involved in the setup of the connection and depending on the number of digits of the node-individual identity numbers, the call number information may in this case comprise many digits in addition to the call number part which is individual to the terminal equipment. The display of such a supplemented call number presupposes a corresponding dimensioning of memories which have to be accessed by the corresponding display control.

It must be taken into consideration here that, for example for implementing the facilities "call-back when free" and "redialing by B subscriber", use of the identity numbers supplemented by the identity numbers of the nodes involved in the original setup of the connection would lead to the following connection being routed via the nodes via which the original connection was routed. However, this would only be appropriate if the network were not to permit a routing any more favorable for call handling at the time at which the following connection is set up than at the time at which the original connection was set up. The described problems in the case of the prior art could be avoided if a line were to be installed from the origin node to the destination node and the connection were to be set up via this line. However, this would require considerable expenditure, in particular if origin node and destination node are at locations which are far apart. This possibility is virtually ruled out in practice if the origin node and destination node are in different continents (Europe/U.S.A.).

The product publications of Siemens AG "Hicom 300 System Produkt Data" [Hicom 300 System Product Data], ordering number A19100-K3161-430-X-7600, pages 55/56 and "Private Kommunikationssysteme, Hicom schafft Verbindungen" [Private Communication Systems, Hicom creates Connections], ordering number A19100-K3160-A302, page on "Hicom 300 Networking" disclose a communication system ("Hicom 300") which can form a network node. In such a network, signalling information on telecommunication connections to be set up is formed and in this information a node number designating the origin node and the call number of the telecommunication terminal equipment on the transmission side are supplemented by identity numbers of nodes involved in the setup of the connection, so that the disadvantages described above arise.

SUMMARY OF THE INVENTION

The invention is based on the object of specifying a process for call number signalling which permits simplified evaluation for telecommunication terminal equipment on the reception side.

This object is achieved according to the invention by a process for signalling the call number in a telecommunication network, telecommunication connections being routed from telecommunication terminal equipment on the transmission side via an origin node, via transit nodes to telecommunication terminal equipment on the reception side. The following is inserted into first signalling information of the telecommunication connection to be set up: a node number designating the origin node; the call number of the telecommunication terminal equipment on the transmission side; a node identity number, assigned to the telecommunication terminal equipment on the reception side and entered into the telecommunication terminal equipment on the transmission side and the call number of the telecommunication terminal equipment on the reception side. In the nodes involved in the setup of the connection it is checked on the basis of the node number of the origin node and on the basis of the identity number of the telecommunication terminal equipment on the reception side whether the call number of the telecommunication-terminal equipment on the transmission side is to be supplemented by the identity number of the respective node. The call number of the telecommunication terminal equipment on the transmission side is supplemented in the origin node by the identity number designating the origin node and is not supplemented in the nodes following the origin node by the identity numbers designating these nodes.

To be regarded first of all as an advantage of the way in which the object is achieved according to the invention is that the hardware configuration of the network does not have to be changed. In particular, no line or line group has to be installed between origin node and destination node. It is to be regarded as a further advantage of the way in which the object is achieved according to the invention that the display controls tied in with the call number signalling, or the control program assigned to the said controls, and the memory devices to receive the information to be indicated can be taken over unchanged.

Further advantageous embodiments of the invention are as follows.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 4 shows the structure of the signalling information formed by the nodes according to FIGS. 1 and 2.

DESCRIPTION OF THE PREFERRED EMBODIMENT

Figure 1:
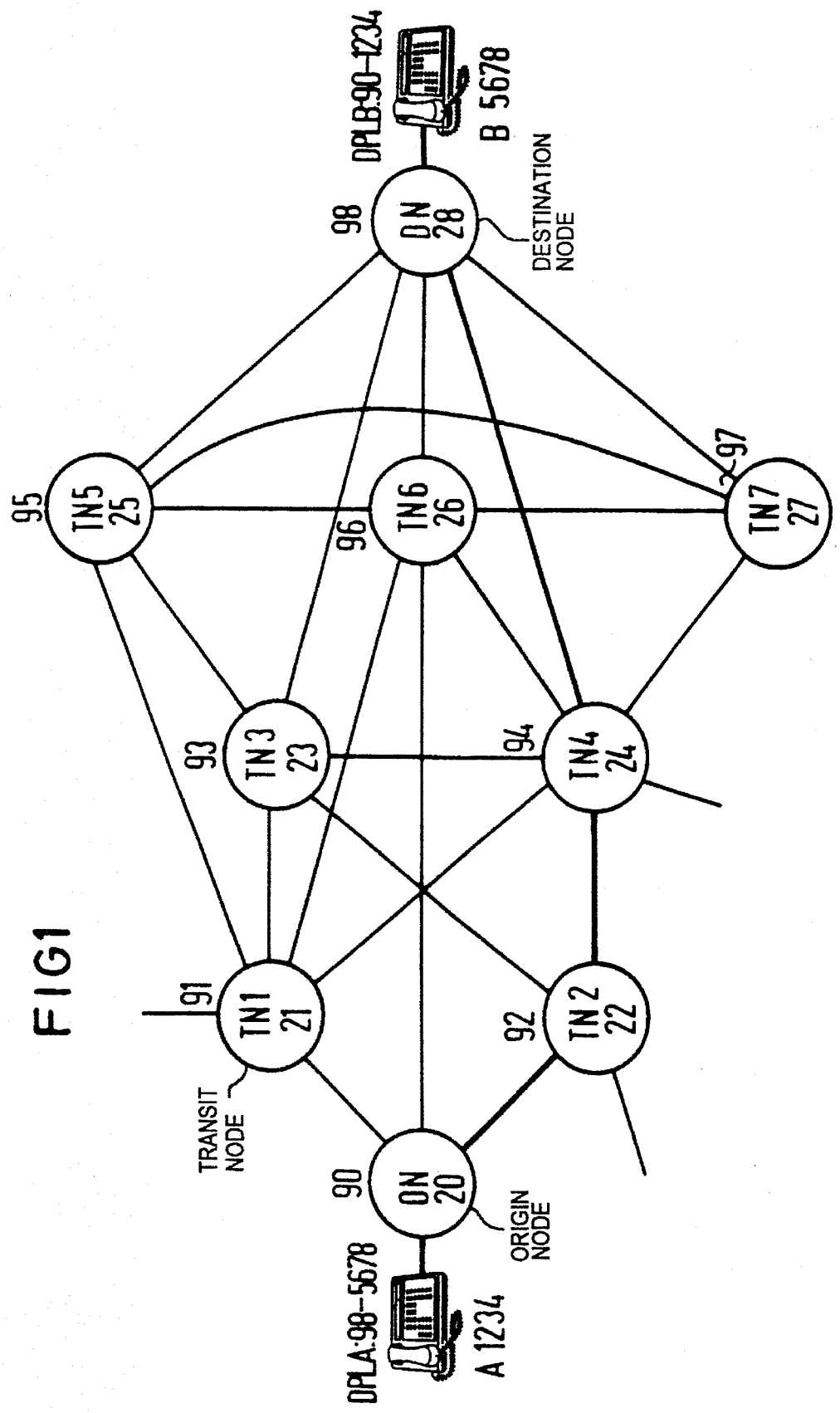
FIG. 1 shows a network in which the call number signalling according to the invention takes place.

In FIG. 1 there is represented a meshed network with a plurality of nodes, with telecommunication equipment on the transmission side (A) (for example a telephone set or a fax machine), and with telecommunication equipment on the reception side (B). With regard to a telecommunication connection which is to be set up from A to B, the network nodes have the function of an origin node ON (Origin Node), of transit nodes TNx (Transition Node) and of a destination node DN (Destination Node). The network comprises, for example, 7 transit nodes TN1 ... TN7, which are interconnected, as indicated in FIG. 1. Consequently, a telecommunication connection between A and B can be established over various routes: for example over the route ON-TN6-DN, ON-TN2-TN4-DN, and ON-TN2-TN3-TN5-TN7-TN6-DN.

The nodes ON, TN1, ... TN7, DN are assigned individual node numbers 20 ... 28 and individual identity numbers 90 ... 98. In FIG. 1, the node numbers are indicated in the circles symbolically representing the nodes underneath the node names ON, TN1, ... TN7, DN and the identity numbers are indicated above these circles. The term of the "node number" designates an operational datum fixed throughout the network.

While the origin node number is transmitted in cross-node traffic, the node numbers of the remaining nodes involved in the setup of the connection are not transmitted. These node numbers may be used in conjunction with the process according to the invention for node-internal checks still to be described. The term of the "identity number" on the other hand designates a dialed digit, or a combination of dialed digits, which is to be chosen in cross-node traffic with open signalling and is to be used as a prefix for the actual terminal equipment call number. Depending on the network protocol used and depending on the control programs assigned to the network node controls, the checks performed in the case of the process according to the invention may be performed on the basis of the node numbers and/or on the basis of the identity numbers.

It is now assumed that a telecommunication connection is being set up from A via the nodes ON (20), TN2 (22), TN4 (24), DN (28) to B. Let the call number of A be 1234 and the call number of B be 5678; let the destination node DN have the node identity number 98. The remaining nodes involved in the setup of the connection, nodes ON, TN2, TN4, DN, have the node identity numbers 90, 92, 94 and 98. For dialing B, the dialed digits 98 5678 are entered into the terminal equipment A. In addition to the A call number (1234), the origin node number (20) and the dialed B call number, including the (destination) node identity number (98 5678), are inserted in a way known per se into the signalling information of the telecommunication connection to be set up.

In each node involved in the setup of the connection it is then checked whether, and if so in what way, the A call number (1234) is to be modified. This check takes place on the basis of the origin node number (20) and also on the basis of the (destination) node identity number (direction identity number 98). In the network nodes, the assignment of (destination) node identity numbers and destination node numbers is stored.

The first network node involved in the setup of the connection is the origin node (ON). The control of the origin node (CTN, cf. FIG. 2) initially forms from the (destination) node identity number (98) the destination node number (28) and then consults a call number modification table stored in the node (FIG. 3a). This table indicates according to the destination node number (here 28) whether, and if so in what way, the A call number (cf. claim 1) or the B call number (origin node number 28 and destination node number 20) is to be modified. In the present case there occurs the check performed for the A call number, that the A call number is to be supplemented by the (origin) node identity number "90" (FIG. 3a: row "20", column "28"). This supplementing is implemented by the control CTN of the origin node, so that the node identity number 90 is inserted in addition to the A call number 1234 into the signalling information of the telecommunication connection to be set up.

The telecommunication connection is then routed from the origin node "20" to the transit node "22". As before it the control of the origin node, the control of this node (CTN, cf. FIG. 2) forms from the (destination) node identity number (98) the destination node number (28) and consults the call number modification table stored in the node (FIG. 3b). In the present case there occurs the check performed for the A call number, that the A call number is not to be supplemented by the (TN2) node identity number "92" (FIG. 3b: row "22", column "28"). The signalling information thus does not undergo any modification; the A call number 1234 remains just supplemented by the origin node identity number 90.

In the remaining nodes involved in the setup of the connection, nodes TN4 and DN, the respective node control CTN (cf. FIG. 2) carries out the corresponding checks, with the result which occurred in the transit node TN2:

The A call number contained in the signalling information is not supplemented by the respective node identity number "94" or "98". The A call number 1234 supplemented only by the origin node identity number "90" is thus fed to the telecommunication terminal equipment on the reception side B, where it is available for indication on a display DPLB or for the implementation of other facilities. The A call number is thus made available to the terminal equipment on the reception side irrespective of the route actually taken.

The return signalling of the B call number from the terminal equipment B to the terminal equipment A takes place in an analogous way, noting that the "destination node" (28) of the setup of the connection is identical to the "origin node" (28) of the return signalling and that the "origin node" (20) of the setup of the connection is identical to the destination node "20" of the return signalling. The return signalling takes place via the nodes involved in the setup of the connection (20-22-24-28), although in the reverse order (28-24-22-20). The controls of the nodes involved in the return signalling carry out the checks described in conjunction with the setup of a connection and in each case consult the call number modification tables stored in the nodes (FIGS. 3c, 3b and 3a: row "28", column "20"). It follows that the B call number contained in the (return) signalling information is supplemented only in the node "28" by the node identity number "98". The telecommunication terminal equipment on the transmission side A is thus fed the B call number 5678 supplemented only by the node identity number "98", where it is available for indication on a display DPLA or for the implementation of other facilities. The B call number is thus made available to the terminal equipment on the transmission side irrespective of the route actually taken.

Figure 2:
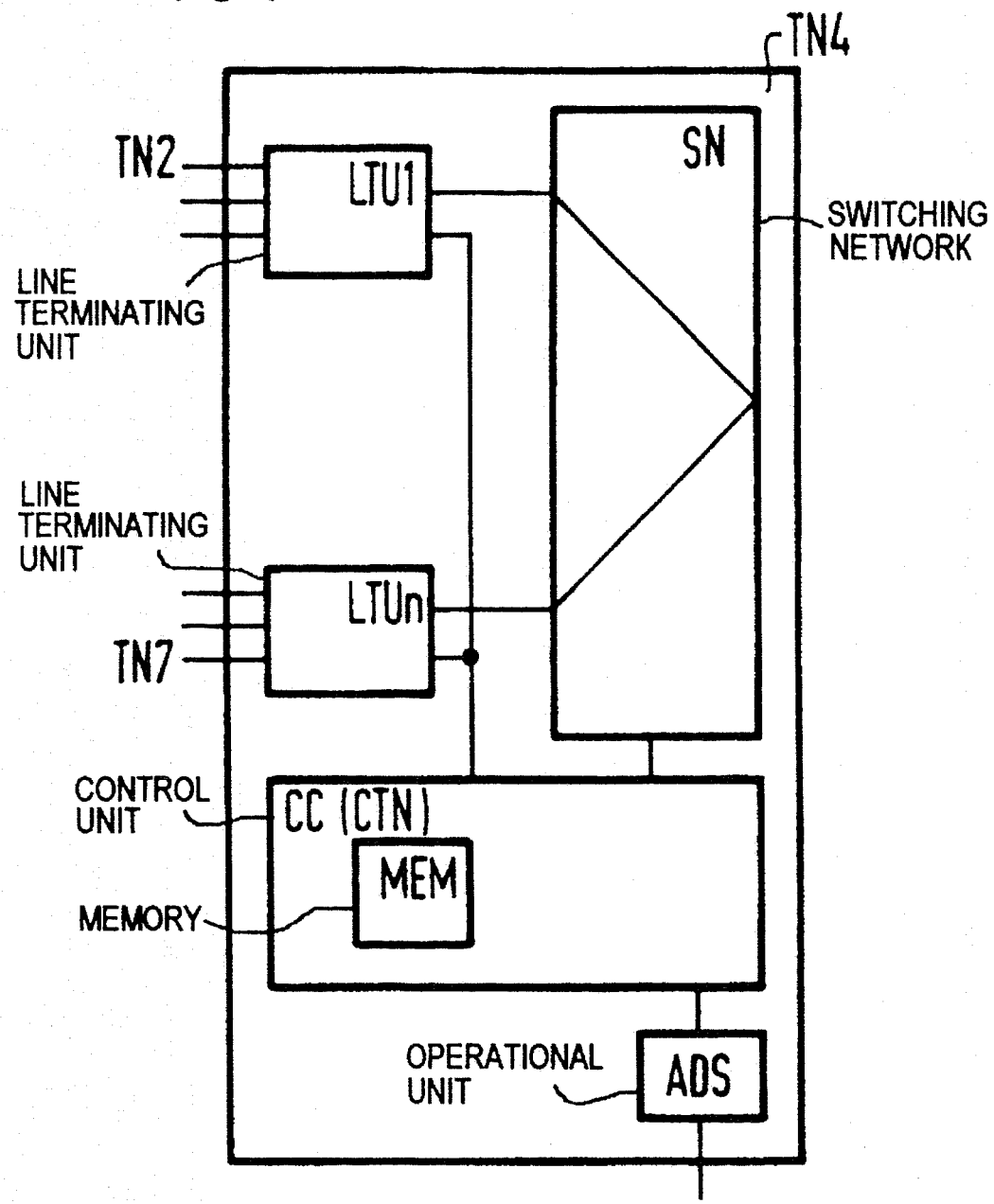
FIG. 2 shows a block diagram of a node in a network according to FIG. 1, and FIGS. 3a, 3b, and 3c depict tables which are assigned to nodes in the network according to FIG. 1.

The nodes are, in particular, communication systems which are disclosed in the published European Patent Applications EP 0306693 A1 (U.S. Pat. No. 4,903,258 hereby incorporated by reference), EP 0303870 A2 (U.S. Pat. No. 5,018,097 hereby incorporated by reference) and EP 0303869 A1 (U.S. Pat. No. 5,047,923 hereby incorporated by reference). In FIG. 2, only the components of the communication system required for an understanding of the invention are represented: this system comprises a control CC (CTN), a switching network SN and also line terminating units LTU1 . . . LTUn. These line terminating units comprise subscriber line circuits and trunk circuits. The subscriber line circuits are subscriber-oriented device connections, such as for example ISDN basic accesses for digital monofunctional and multifunctional terminal devices. The trunk circuits serve for connection with public and/or private networks and are, for example, ISDN basic accesses for ISDN outside traffic and ISDN internet traffic.

The subscriber line circuits and trunk circuits have the same system-internal interfaces. They couple the individual basic channels, on which user data, i.e. voice and/or data information, are transmitted, to any desired selection of two multiplex channels with, for example, 32 channels of the switching network SN and transfer the signalling information transmitted into a control channel as the HDLC protocol to the control CC (CTN). This control is assigned a memory MEM, in which the table information indicated in FIG. 3 is stored. The table information can be configured in particular by means of operational commands, which are to be entered into an operational unit ADS. The communication system represented in FIG. 2, which for example forms the node TN4, establishes connections, inter alia, with neighboring nodes, for example with the nodes TN2 and TN7.

The meshed network represented in FIG. 1 may be, for example, a network for which the known CorNet Protocol is implemented (Siemens Aktiengesellschaft Private Communication Systems and Networks Division: "CorNet Signalling for ISDN Communication in Corporate Networks", ordering no. A19100-K 3110-G284-X-7600, Berlin and Munich 1987; "CorNet functional specification"). The message for the setup of the connection ("Setup message") may in this case be structured as in FIG. 4. This message in this case comprises the following information elements: Protocol discriminator, Call reference, Message type 103, . . . Called party number 104, . . . Calling party number 105, . . . Equipment identification 106, . . .

The information element "Protocol discriminator" indicates the type of protocol, for example CorNet; "Call reference" designates a consecutive process number and "message type" designates the type of signalling message, here: "setup of a connection" (Setup).

The "Called party number" (B call number) contains in addition to the actual call number the identity number, for example 98, which is assigned to the destination node DN (28).

The information element "Calling party number" designates the A call number, which in call number signalling with open numbering is supplemented by the identity number assigned to the origin node. If in the case of the process according to the invention the origin node number is not contained in the signalling information, or cannot be evaluated by a network node control, the latter converts the origin node identity number into the origin node number during the evaluation of the tables according to FIG. 3.

The information element "Equipment identification" designates the node number (for example 20) of the origin node. Furthermore, there may also be an information element "Connected party number".

This is inserted into the return message ("Alert", "second signalling information") when the connection to B, or (for example in the case of call diversion) to another device in the terminal equipment on the reception side, has been set up. This information element then designates the call number of B or the call number of the other terminal device.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A process for signalling a call number in a telecommunication network, telecommunication connections being routed from telecommunication terminal equipment on a transmission side via an origin node, via transit nodes and a destination node to telecommunication terminal equipment on a reception side, there being inserted into first signalling information of the telecommunication connection to be set up a node number designating the origin node, a call number of the telecommunication terminal equipment on the transmission side, a node identity number of the destination node assigned to the telecommunication terminal equipment on the reception side and entered into the telecommunication terminal equipment on the transmission side, and a call number of the telecommunication terminal equipment on the reception side, comprising the steps of:

checking in the nodes involved in a setup of the connection, on the basis of the node number of the origin node and on the basis of the node identity number of the destination node assigned to telecommunication terminal equipment on the reception side whether the call number of the telecommunication terminal equipment on the transmission side is to be supplemented by the identity number of a respective node, and supplementing the call number of the telecommunication terminal equipment on the transmission side in the origin node by the identity number designating the origin node and not supplementing the call number of the telecommunication terminal equipment on the transmission side in the nodes following the origin node by the identity numbers designating the nodes following the origin node.

2. The process as claimed in claim 1, wherein after the setup of the telecommunication connection from the telecommunication terminal equipment on the transmission side to the telecommunication terminal equipment on the reception side, second signalling information is formed, which is transmitted from the telecommunication terminal equipment on the reception side to the telecommunication terminal equipment on the transmission side with the call number of the telecommunication terminal equipment on the reception side, wherein in the nodes involved in the setup of the connection it is checked on the basis of the identity number of the destination node and on the basis of the node number of the origin node whether the call number of the telecommunication terminal equipment on the reception side is to be supplemented by the identity number of the respective node, and wherein the call number of the telecommunication terminal equipment on the reception side is supplemented in the destination node, representing the second signalling information, by the identity number designating the destination node, which effectively is an origin node with respect to said second signalling information, and is not supplemented in the nodes following the destination node with respect to the second signalling information by the identity numbers designating the nodes following the destination node.

3. An arrangement for signalling a call number in a telecommunication network, telecommunication connections being routed from telecommunication terminal equipment on a transmission side via an origin node, via transit nodes and a destination node to telecommunication terminal equipment on a reception side, there being inserted into first signalling information of the telecommunication connection to be set up a node number designating the origin node, a call number of the telecommunication terminal equipment on the transmission side, a node identity number of the destination node assigned to the telecommunication terminal equipment on the reception side and entered into the telecommunication terminal equipment on the transmission side, and a call number of the telecommunication terminal equipment on the reception side, comprising:

means for checking in the nodes involved in a setup of the connection, on the basis of the node number of the origin node and on the basis of the node identity number of the destination node assigned to the telecommunication terminal equipment on the reception side whether the call number of the telecommunication terminal equipment on the transmission side is to be supplemented by the identity number of a respective node; and means for supplementing the call number of the telecommunication terminal equipment on the transmission side in the origin node by the identity number designating the origin node and not supplementing the call number of the telecommunication terminal equipment on the transmission side in the nodes following the origin node by the identity numbers designating the nodes following the origin node.

* * * * *